(12) United States Patent
Matoba

(10) Patent No.: US 7,236,837 B2
(45) Date of Patent: Jun. 26, 2007

(54) REPRODUCING APPARATUS

(75) Inventor: Kenjiro Matoba, Miyazaki (JP)

(73) Assignee: Oki Electric Indusrty Co., Ltd, Tokyo (JP)

( * ) Notice: Subject to any disclaimer, the term of this patent is extended or adjusted under 35 U.S.C. 154(b) by 1163 days.

(21) Appl. No.: 09/810,445

(22) Filed: Mar. 19, 2001

(65) Prior Publication Data
US 2002/0065569 A1 May 30, 2002

(30) Foreign Application Priority Data
Nov. 30, 2000 (JP) ............................. 2000-364402

(51) Int. Cl.
G06F 17/00 (2006.01)
G10L 21/00 (2006.01)
G10L 21/04 (2006.01)

(52) U.S. Cl. .................... 700/94; 704/503; 704/504

(58) Field of Classification Search ............... 704/503, 704/500, 501, 502, 504; 84/612, 652; 360/8; 399/60.01; 370/109; 381/106; 700/94
See application file for complete search history.

(56) References Cited

U.S. PATENT DOCUMENTS

| | | | |
|---|---|---|---|
| 4,757,450 A * | 7/1988 | Etoh ........................... 701/96 |
| 4,757,540 A * | 7/1988 | Davis .......................... 704/278 |
| 5,870,397 A * | 2/1999 | Chauffour et al. .......... 370/435 |
| 6,232,540 B1 * | 5/2001 | Kondo ......................... 84/612 |
| 6,373,421 B2 * | 4/2002 | Uchiyama et al. .......... 341/155 |
| 2003/0158734 A1 * | 8/2003 | Cruickshank ............... 704/260 |

FOREIGN PATENT DOCUMENTS

| | | |
|---|---|---|
| JP | 05-291839 | 5/1993 |
| JP | 07-287576 | 10/1995 |
| JP | 2000-243065 A | 9/2000 |

OTHER PUBLICATIONS

Dictionary.com Definition of calculate.*

* cited by examiner

Primary Examiner—Sinh Tran
Assistant Examiner—Andrew C Flanders
(74) Attorney, Agent, or Firm—Rabin & Berdo, PC

(57) ABSTRACT

A reproducing apparatus according to the present invention includes a thinning-out unit for thinning out part of a plurality of continuous audio digital data, and a conversion unit for simply increasing or decreasing variations in the amplitude of either continuous plural data including the data immediately preceding the thinned data or continuous plural data including the data immediately following the thinned data so that the data immediately preceding the thinned data will be concatenated with the data immediately following the thinned data along a smooth amplitude-varying curve.

12 Claims, 4 Drawing Sheets

BLOCK DIAGRAM SHOWING CONFIGURATION OF REPRODUCING APPARATUS ACCORDING TO PREFERRED EMBODIMENT

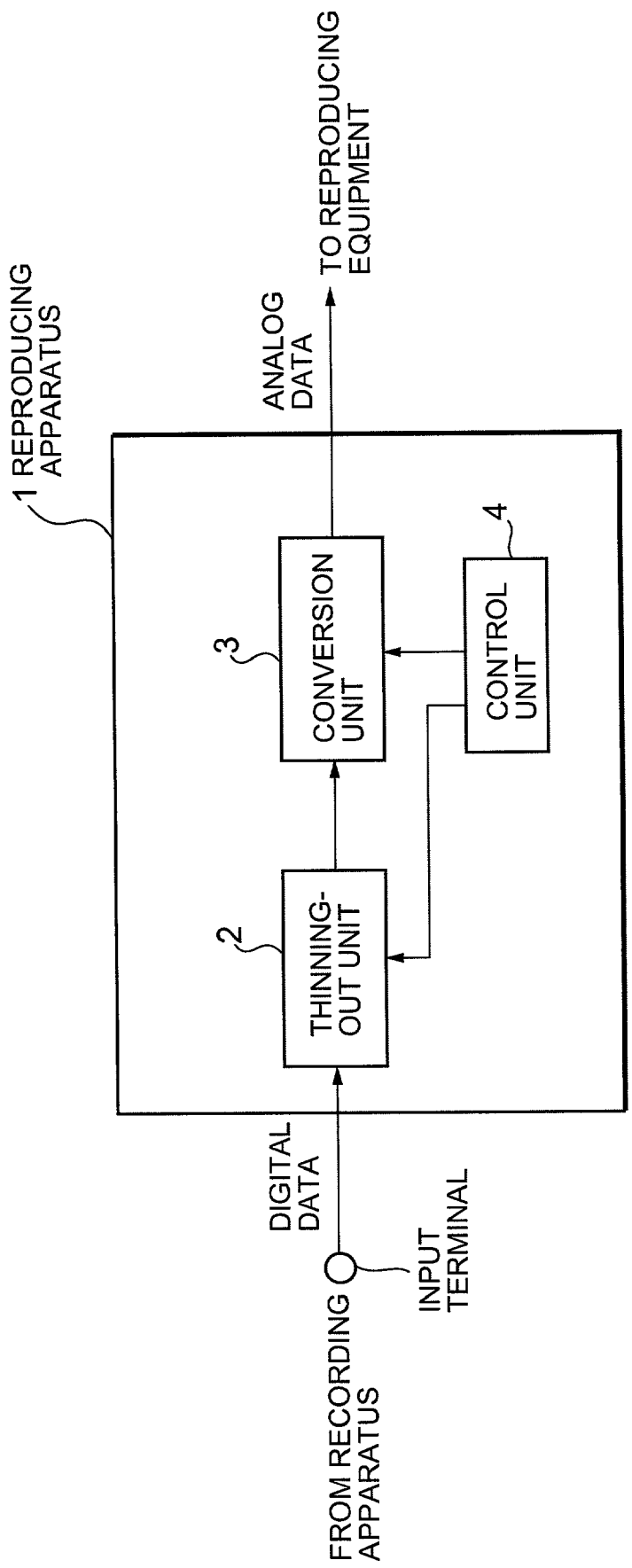

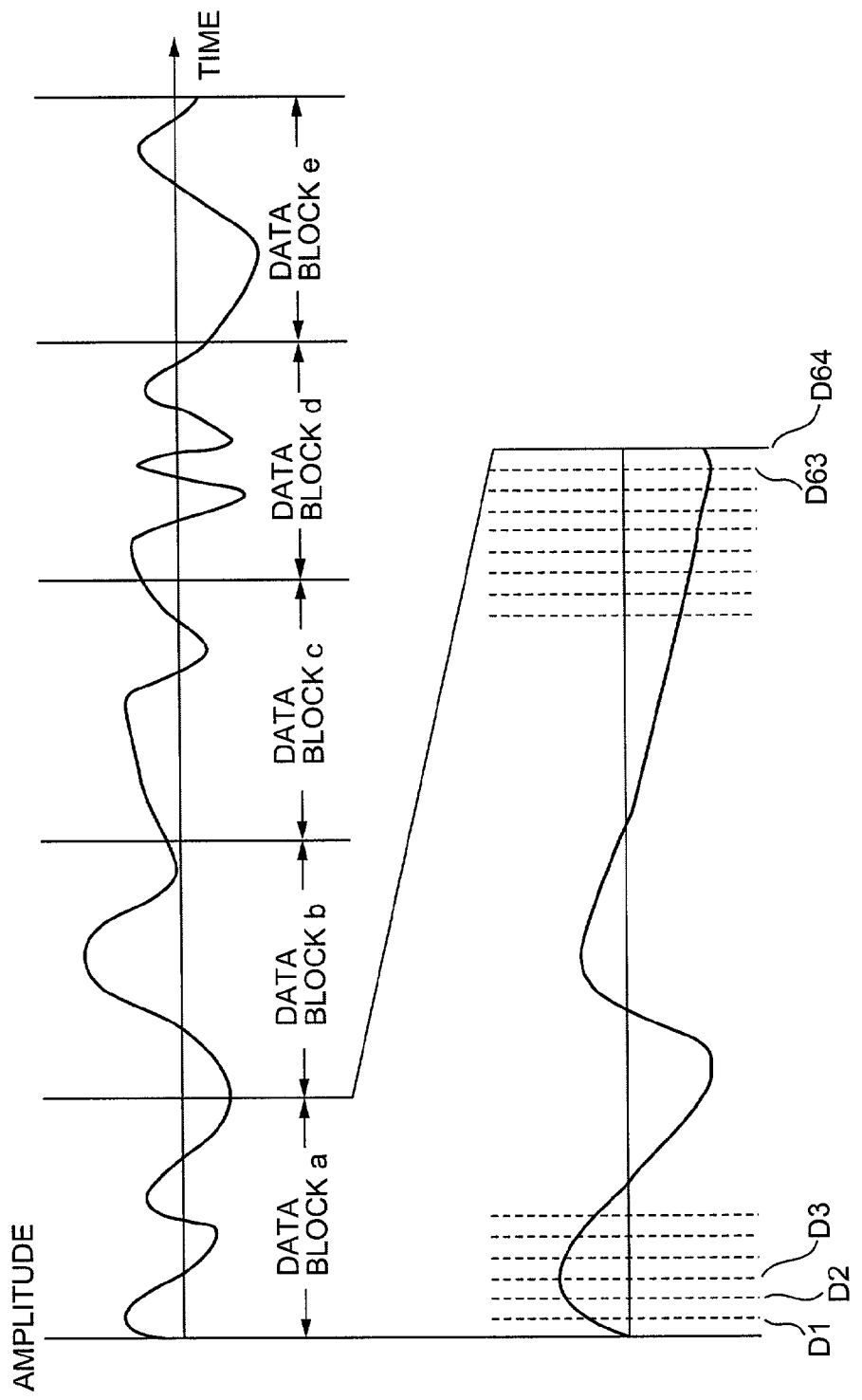

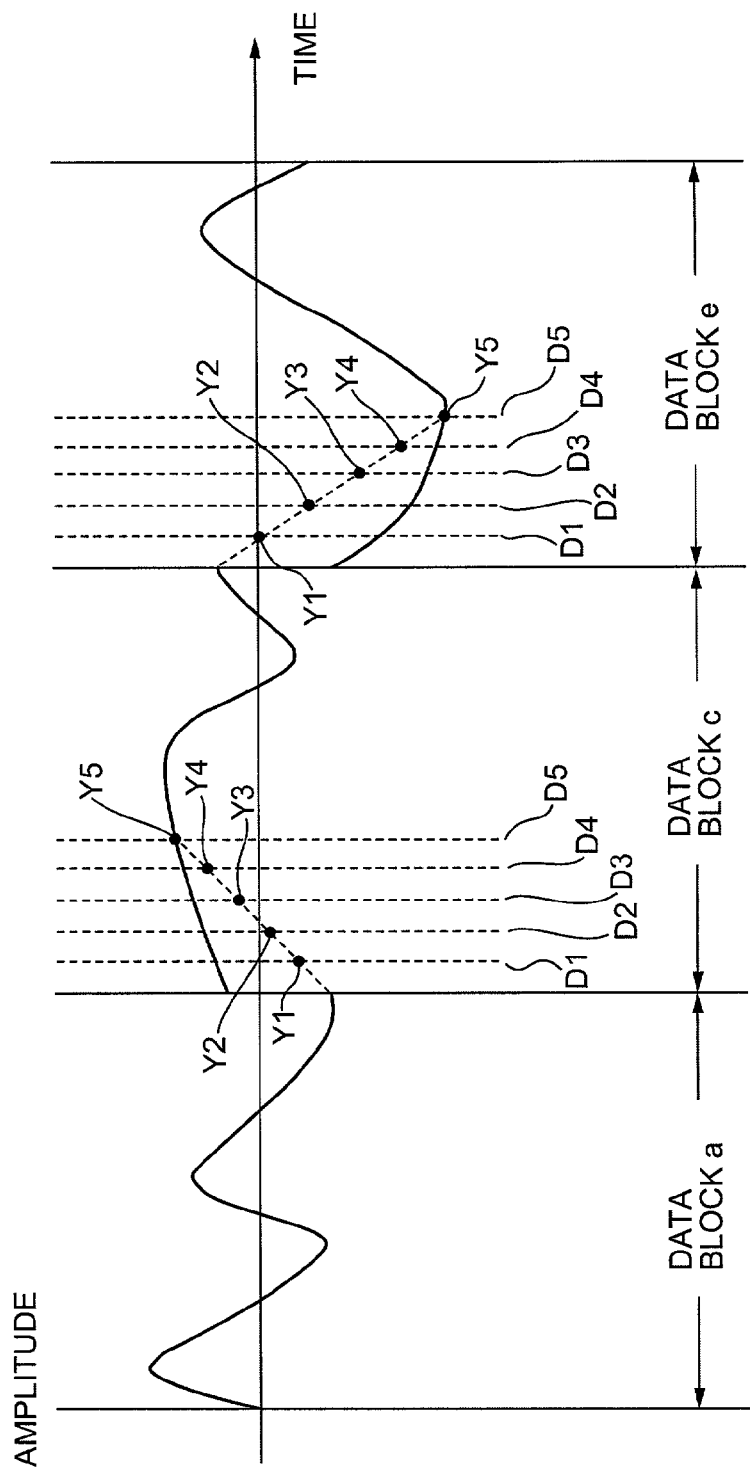

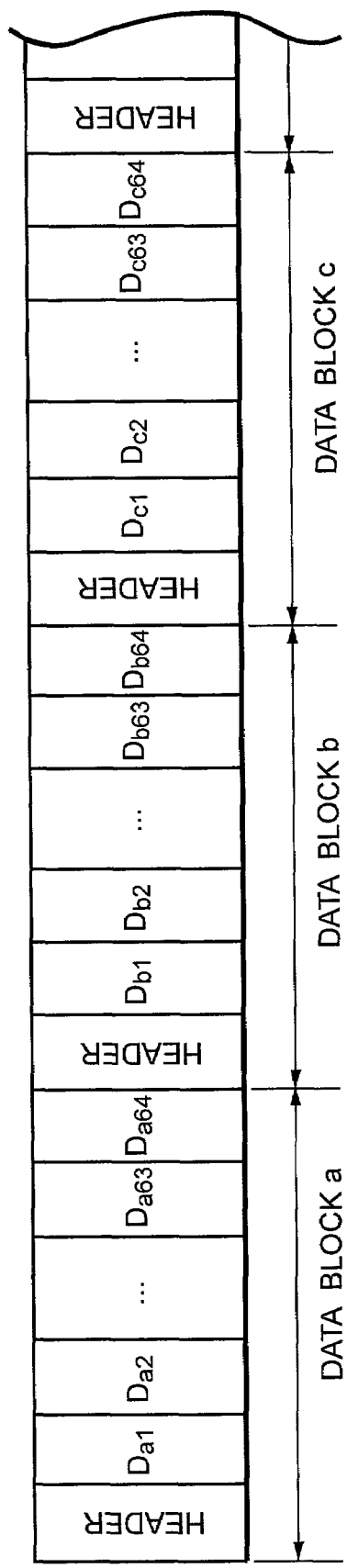
FIG.4 DIAGRAM SHOWING AUDIO DIGITAL DATA INCLUDING COMPRESSED DATA

REPRODUCING APPARATUS

BACKGROUND OF THE INVENTION

1. Field of the Invention

This invention relates to a reproducing apparatus that thins out a plurality of continuous audio digital data representative of audio signals such as voice or music recorded on a recording medium so that the thinned data will be reproduced in fast-forward.

2. Description of the Prior Art

When audio data are thinned out before being reproduced, the boundary between data immediately preceding the thinned data and data immediately following the thinned data may be made discontinuous, causing abrupt variations in sound volume and hence noise. Such noise needs to be reduced, so a technique has been proposed to reduce the noise. In the technique, the amplitude or sound volume of a plurality of continuous data that precede the thinned data is gradually reduced to zero on the boundary, while the sound volume of a plurality of data that follow the thinned data is gradually increased from zero. Such a conventional technique makes it possible to reduce the noise resulting from abrupt variations in the amplitude on the boundary of data caused by thinning out the data therebetween.

However, such a technique as to gradually reduce the sound volume, make it zero once, and gradually increase it again produces a hum because it is to temporarily turn down and then turned up the sound volume of plural data preceding the thinned data and plural data following the thinned data. This causes another problem that the hum grates upon the ear.

SUMMARY OF THE INVENTION

It is an object of this invention to provide a reproducing apparatus that enables excellent reproduction by concatenating data immediately preceding thinned data with data immediately following the thinned data without noise and hum occurring.

In attaining the above-mentioned object and according to this invention, there is provided a reproducing apparatus which includes a thinning-out unit for thinning out part of continuous plural audio digital data, and a conversion unit for simply increasing or decreasing variations in the amplitude of either continuous plural data including the data immediately preceding the thinned data or continuous plural data including the data immediately following the thinned data so that the data immediately preceding the thinned data and the data immediately following the thinned data will be concatenated with each other along a smooth amplitude-varying curve.

BRIEF DESCRIPTION OF THE DRAWINGS

FIG. 1 is a block diagram showing a configuration of a reproducing apparatus according to a preferred embodiment of the present invention;

FIG. 2 is a graph showing audio digital data;

FIG. 3 is a graph showing a string of data blocks after thinned out; and

FIG. 4 is a diagram showing audio digital data including compressed data.

DETAILED DESCRIPTION OF THE INVENTION (First Embodiment)

FIG. 1 shows a configuration of a reproducing apparatus according to a preferred embodiment of the present invention. The reproducing apparatus 1 includes a tinning-out unit 2, a conversion unit 3 and a control unit 4. The thinning-out unit 2 is to thin out audio digital data on a data block basis as described later, the audio digital data being representative of audio signals such as voice or music output from a recording apparatus such as a magnetic tape or magnetic disk, not shown. The conversion unit 3 concatenates data immediately preceding the data thinned out by means of the thinning-out unit 2 with data immediately following the thinned data. The conversion unit 3 then converts plural data including the immediately preceding data and immediately following data from digital to analog to output the converted analog data to reproducing equipment, not shown, composed of an amplifier, a speaker, and so on. The control unit 4 controls the operation of the thinning-out unit 2 and the conversion unit 3.

FIG. 2 shows audio digital data output from the recording apparatus and input to the reproducing apparatus 1. As shown, the audio digital data include a sequence of data blocks a to e each of which consists of 64 units of data D1 to D64 (called simply "data" hereafter). As an example, FIG. 2 shows that the data block a consists of 64 data D1 to D64, and that audio reproduction is performed as indicated by an envelop specified by the data D1 to D64. The audio digital data including such plural data blocks are then thinned out on a data block basis so that the digital data after thinned out will be reproduced at a frequency lower than the frequency at which the digital data before thinned out is reproduced.

The following describes the operation of the reproducing apparatus according to the preferred embodiment. The digital data output from the recording apparatus and input to the reproducing apparatus 1 are thinned out at the thinning-out unit 2 on a block basis.

FIG. 3 shows data blocks after being thinned out by means of the thinning-out unit 2. The thinning-out unit 2 performs thinning-out of data every other block, that is, it removes the data blocks b and d from the data blocks a to e to create a string or sequence of data blocks a, c and e as shown in FIG. 3. The string of data blocks thus created is forwarded to the conversion unit 3.

Upon receipt of the string of data blocks, the conversion unit 3 concatenates the data blocks as drawing smooth amplitude-varying curves on the boundaries between adjacent data blocks. To be more specific, the last data of one data block and two or more leading data of the immediately following data block are smoothly concatenated by simply increasing or decreasing the amplitude of the two or more leading data on the basis of the last data of the one data block and the first data of the immediately following data block.

For example, the conversion unit 3 uses the amplitude of the last data $D_{64}$ of the data block a, the amplitude of the first data $D_1$ of the data block c, and indications n (n=1, 2, 3, 4, 5) representing positions of two or more leading data $D_1$ to $D_5$ of the data block c to calculate amplitudes $Y_1$ to $Y_5$ of the data $D_1$ to $D_5$ after simply increased according to the following equation (1):

$$Y_n = Y_{Dn} - (Y_{D1} - Y_{D64}) \times (5-n)/5 \qquad (1),$$

where $Y_{Dn}$ is the amplitude of data $D_n$, $Y_{D1}$ is the amplitude of data $D_1$, and $Y_{D64}$ is the amplitude of data $D_{64}$. Thus the data blocks a and c are smoothly concatenated using the amplitudes $Y_1$ to $Y_5$.

Then, the conversion unit 3 uses the amplitude of the last data $D_{64}$ of the data block c, the amplitude of the first data $D_1$ of the data block e that follows the data block c, and the above-mentioned equation (1) in the same way to calculate amplitudes $Y_1$ to $Y_5$ of the data $D_1$ to $D_5$ after simply decreased. Thus the data block c and the data block e are smoothly concatenated using the amplitudes $Y_1$ to $Y_5$.

It should be noted that the conversion unit 3 outputs the data $D_6$ to $D_{64}$ other than the data $D_1$ to $D_5$ as they are without converting the same.

The string of data blocks converted at the conversion unit 3 is subjected to digital-to-analog conversion to create analog data which are then output to the reproducing equipment. Thus the audio digital data output from the recording apparatus is reproduced on the reproducing equipment.

According to the preferred embodiment, the reproducing apparatus is such that the thinning-out unit 2 thins out the audio digital data on a data block basis. Then the conversion unit 3 smoothly concatenates the last data of a data block immediately preceding a thinned data block with two or more leading data of a data block immediately following the thinned data block by simply increasing or decreasing the two or more leading data of the data block immediately following the thinned data block on the basis of the amplitude of the last data of the immediately preceding data block and the amplitude of the first data of the immediately following data block. This makes it possible to avoid occurrence of noise due to abrupt variations in amplitude caused by thinning-out of data, and hence occurrence of hum caused by the conventional technique for increasing the amplitude after decreasing the same.

In the above-mentioned embodiment, the immediately preceding data block and the immediately following data block are smoothly concatenated by simply increasing or decreasing the amplitude of the five leading data of the data block immediately following the thinned data block without varying the amplitude of the last data of the data block immediately preceding the thinned data block. Alternatively, the immediately preceding data block and the immediately following data block may be smoothly concatenated by simply increasing or decreasing the amplitude of two or more trailing data of the data block immediately preceding the thinned data block without varying the amplitude of the first data of the data block immediately following the thinned data block.

Further, in the above-mentioned embodiment, the number of data the amplitude of which is to be simply increased or decreased is five, but the number may be three, eight or ten. The less the number of data the amplitude of which is to be simply increased or decreased, the lighter the work load of calculating the amplitude according to the equation (1), but the lower the smoothness of the concatenated portions. On the other hand, the more the number of data the amplitude of which is to be simply increased or decreased, the heavier the work load of calculating the amplitude according to the equation (1), but the higher the smoothness of the concatenated portions.

(Second Embodiment)

In the first embodiment, after concatenating data blocks by simply increasing or decreasing the amplitude of two or more data, the conversion unit 3 converts into analog data all the data regardless of whether the amplitude of the data has been simply increased or decreased. Alternatively, the conversion unit 3 may integrate the two or more data after simply increased or decreased so that all the data, that is, both the integrated data and the data the amplitude of which has not been simply increased or decreased and hence which has not been integrated, will be converted into analog data. This makes possible more smooth concatenation of the data block immediately preceding the thinned data block with the data block immediately following the thinned data block.

(Third Embodiment)

In the first embodiment, the audio digital data supplied from the recording apparatus include two or more data blocks as shown in FIG. 2, each of the data block consisting of 64 uncompressed data. Instead of such uncompressed data sets, the present invention may use such compressed data sets as obtained by calculating current-time data on the basis of the previous data that has been timed immediately before the current-time data is timed.

FIG. 4 shows another configuration of audio digital data. The audio digital data includes two or more data blocks in the same manner as those described above, but each of the data blocks consists of 64 compressed data and header information indicating which is the first data of the data block. For example, the data block b consists of 64 compressed data Db1 to Db64 and header information from which the first data Db1 of the data block b is obtained.

Upon receipt of such digital data from the recording apparatus, the thinning-out unit 2 thins out the data blocks in the same manner as in the first embodiment. Suppose that the thinning-out unit 2 removes the data block b and outputs a string of data blocks including data blocks a and c to the conversion unit 3. Upon receipt of the string of data blocks from the thinning-out unit 2, the conversion unit 3 smoothly concatenates the last data Da64 of the data block a with five leading data Dc1 to Dc5 of the data block c in the same manner as described first above by simply increasing or decreasing the amplitude of the five leading data Dc1 to Dc5 of the data block c without varying the amplitude of the last data D64 of the data block a.

It should be noted that trailing data Da60 to Da64 of the data block a may be smoothly concatenated with the first data Dc1 of the data block c in the same manner as in the first embodiment by simply increasing or decreasing the amplitude of the trailing data Da60 to Da64 of the data block a.

What is claimed is:

1. A reproducing apparatus comprising:
   an input terminal for inputting audio digital data including a sequence of data blocks each of which consists of a predetermined number of units of data;
   a thinning-out unit for thinning out part of the audio digital data on a data block basis; and
   a conversion unit for varying the amplitude of either a sequence of units of data including the last unit of data of a data block immediately preceding a thinned data block or a sequence of units of data including the first unit of data of a data block immediately following the thinned data block, so that the last unit of data of the immediately preceding data block will be concatenated with the first unit of data of the immediately following data block along a smooth amplitude-varying curve,
   wherein the amplitude-varying curve is calculated to a simply increasing or decreasing function, and
   wherein the simply increasing or decreasing function is determined on the basis of the difference between the amplitude of the last unit of data of the data block immediately preceding the thinned data block and the amplitude of the first unit of data of the data block immediately following the thinned data block, the amplitude of the units of data of which the amplitude is to be varied in the immediately following data block, position information of the units of data, and the number of units of data in the sequence of units of data.

2. A reproducing apparatus according to claim 1, wherein said conversion unit integrates the sequence of units of data the amplitude of which has been varied.

3. A reproducing apparatus according to claim 1, wherein the units of data of each data block are compressed audio data, each data block further includes header information from which the first unit of data of the data block is obtained, and units of data following the first unit of data are decompressed on the basis of the immediately preceding unit of data of the data block.

4. A reproducing apparatus comprising:
an input terminal for inputting audio digital data including a sequence of data blocks each of which consists of a predetermined number of units of data;
a thinning-out unit for thinning out part of the audio digital data on a data block basis;
a conversion unit for varying the amplitude of either a sequence of units of data including the last unit of data of a data block immediately preceding a thinned data block or a sequence of units of data including the first unit of data of a data block immediately following the thinned data block, so that the last unit of data of the immediately preceding data block will be concatenated with the first unit of data of the immediately following data block along a smooth amplitude-varying curve; and
a reproducing unit for reproducing both the units of data converted by said conversion unit and units of data not converted by said conversion unit,
wherein the amplitude-varying curve is calculated according to a simply increasing or decreasing function, and
wherein the simply increasing or decreasing function is determined on the basis of the difference between the amplitude of the last unit of data of the data block immediately preceding the thinned data block and the amplitude of the first unit of data of the data block immediately following the thinned data block, the amplitude of the units of data of which the amplitude is to be varied in the immediately following data block, position information of the seqence of units of data, and the number of units of data in the sequence of units of data.

5. A reproducing apparatus according to claim 4, wherein said conversion unit integrates the sequence of units of data the amplitude of which has been varied.

6. A reproducing apparatus according to claim 4, wherein the units of data of each data block are compressed audio data, each data block further includes header information from which the first unit of data of the data block is obtained, and units of data following the first unit of data are decompressed on the basis of the immediately preceding unit of data of the data block.

7. A reproducing apparatus comprising:
an input terminal for inputting audio digital data including a first sequence of data. blocks each of which consists of a predetermined number of units of data, the predetermined number being the same for all of the data blocks in the first sequence;
a thinning-out unit for removing data blocks from the first sequence to form a second sequence of data blocks, the data blocks in the second sequence having been separated in the first sequence by the removed data blocks; and
a conversion unit for varying the amplitude of units of data adjacent boundaries between the data blocks of the second sequence so as to smooth transitions between the data blocks of the second sequence, the conversion unit comprising means for changing the amplitude of the units of data adjacent one of the boundaries in each data block of the second sequence so that the changed-amplitude units of data vary as a monotonic increasing or monotonic decreasing function,
wherein the monotonic increasing or decreasing function is a function of at least the difference in amplitude of units of data between the last unit of data in a data block on one side of said one of the boundaries and the first unit of data in a data block on the other side of said one of the boundaries.

8. A reproducing apparatus according to claim 7, wherein the function is a linear function.

9. A reproducing apparatus according to claim 7, wherein the units of data are uncompressed audio data.

10. A reproducing apparatus according to claim 7, wherein the units of data are compressed audio data.

11. A reproducing apparatus according to claim 7, wherein the first sequence of data blocks has about twice the number of data blocks as the second sequence, the second sequence being formed by removing every other data block from the first sequence.

12. A reproducing apparatus according to claim 7, wherein the monotonic increasing or decreasing function is additionally a function of the amplitudes of the changed-amplitude units of data, position information of the units of data, and the number of units of data in the sequence of units of data.

* * * * *